US011256323B2

(12) United States Patent
Shantharam et al.

(10) Patent No.: US 11,256,323 B2
(45) Date of Patent: Feb. 22, 2022

(54) METHOD AND SYSTEM FOR DETERMINING LIVEABILITY AND HEALTH INDEX

(71) Applicant: KAHA PTE. LTD., Singapore (SG)

(72) Inventors: Sudheendra Shantharam, Bengaluru (IN); Sathiyan Palani, Bengaluru (IN)

(73) Assignee: KAHA PTE. LTD., Singapore (SG)

( * ) Notice: Subject to any disclaimer, the term of this patent is extended or adjusted under 35 U.S.C. 154(b) by 0 days.

(21) Appl. No.: 16/978,624

(22) PCT Filed: Mar. 1, 2019

(86) PCT No.: PCT/SG2019/050116
§ 371 (c)(1),
(2) Date: Sep. 4, 2020

(87) PCT Pub. No.: WO2019/172842
PCT Pub. Date: Sep. 12, 2019

(65) Prior Publication Data

US 2021/0041939 A1 Feb. 11, 2021

(30) Foreign Application Priority Data

Mar. 5, 2018 (SG) ........................... 10201801748Y

(51) Int. Cl.
*G06F 3/01* (2006.01)
*H04W 4/029* (2018.01)
*G06F 16/29* (2019.01)

(52) U.S. Cl.
CPC .............. *G06F 3/011* (2013.01); *G06F 3/017* (2013.01); *G06F 16/29* (2019.01); *H04W 4/029* (2018.02)

(58) Field of Classification Search
None
See application file for complete search history.

(56) References Cited

FOREIGN PATENT DOCUMENTS

| | | | | |
|---|---|---|---|---|
| CN | 106548439 A | | 3/2017 |
| CN | 107016635 A | * | 8/2017 |
| CN | 107016635 A | | 8/2017 |

OTHER PUBLICATIONS

"Global liveability has improved for the first time in a decade" Aug. 16, 2017 https://www.economist.com/graphic-detail/2017/08/16/global-liveability-has-improved-for-the-first-time-in-a-decade.
Onnom et al. "Development of a Liveable City Index (LCI) Using Multi Criteria Geospatial Modeling for Medium Class Cities in Developing Countries" Sustainability 2018, vol. 10, pp. 520-553,9 Feb. 15, 2018.

* cited by examiner

*Primary Examiner* — Adolf Dsouza
(74) *Attorney, Agent, or Firm* — Thomas | Horstemeyer LLP

(57) ABSTRACT

The present invention provides methods and systems for creating and determining liveability index of a location through various parameters relating to environment, water, accessibility etc. The data relating to the parameters may be determined using a smart wearable device in real time and an application server shall determine the liveability of a location based on these parameters and their weightage. In an embodiment, the liveability index is displayed in real-time to the user.

20 Claims, 20 Drawing Sheets

| **Parameters** | |
| --- | --- |
| Traffic data | pressure, |
| Duration of traffic | humidity, |
| Presence of Traffic signal | wind strength |
| Probability of occurring traffic at different time in a day | Pollution<br>i) Quantity and distribution of gases (O2, CO2, etc),<br>ii) Flow of gases towards a direction, iii) Change in quantity of gases due to factories (chemical, toxic, leather etc) |
| Movement of vehicles (speed – slow, medium, fast over speeding) | Location of hospitals, clinics, medical shops |
| Road - speed of walking/jerks can be determined | Number/frequency of visits by a person to hospitals, clinics, medical shops |
| Footpath | Noise level index |
| Traffic intersections with pedestrian crossing | Disease index |
| Vehicles (bus, auto, train, metro, or any vehicle for travel) | Health data of a person (including diseases, disability) |
| Travel routes | People who visit hospital, clinics (probability) |
| Transportation points | Gym activity/ fitness tracker |
| Water availability-data Underground water | Any health-related activity such as marathon, events related to health in a locality |
| Depth of water availability | People who do yoga, pranayama (regular manner), location of institutes |
| Quality of water | Mobile phone access - Time spent in mobiles, games, social networks, you tube etc |
| Terrain data, building data, open space | Mobile phone access -By different age groups |
| Geographical content (latitude and longitude) | Mobile phone access -Probability of radiation from mobile devices |
| Seismic data | Hospital data - Number of hospitals, clinics, medical shops, total number of beds in hospital |
| Parks-area, depth in sq.km | location information & data of Fire station, Police station |
| lakes-area in sq.km | School, colleges |
| Climate related info, Temperature | Electrical sub-station, hubs, transformers, power cuts |

Figure 4(a)

| Parameters | |
|---|---|
| Number of yoga/fitness health teaching institutes teaches such activity | Factory index - Information relating to small, medium, large, chemical related factories |
| Number of parks, trees | Factory index - People dependency index / employment index |
| Affordability index - Shopping complex, jewelry shops, life style shops | Healthcare professionals per 10,000 population |
| Affordability index - Purchasing power | Response time in case of health emergencies |
| Social life index - All places of social activity, entertainment, music, concerts, events, movies, parks, theme parks | Period prevalence of diseases |
| Spiritual index - location of temples, church, spiritual gathering | Population index (people per sq.km), population density |
| Population index (people per sq.km), population density | Number of parks, trees |
| Terrain data | Electrical sub-station, hubs, transformers, power cuts |
| Water consumption data – by people Daily consumption data – water (drinking) | Affordability index - Purchasing power |
| Quality of water | Noise level index |
| Condition of civic amenities - drains, its pathways, footpath | Parks-area in sq.km |
| Number of waste dump yards, its location from locality, amount of waste dumped per day/hour/minute/second | lakes-area in sq.km |
| Segregation units | Water availability-data Underground water |
| Medicine data - Sale of medicines(in hospital, clinics, medical shops) | Depth of water availability |
| Police data – information relating to Theft, accident, burglary, murder or any other incidents in police database | Quality of water |
| Disease index | Vehicles (bus, auto, train, metro, or any vehicle for travel) |
| Air quality | Travel routes |
| Child index - Number of infant/children (age range),Health and Medicine monitor for children below 5 yrs | Transportation points |
| School information (timings, no. of children studying, quality of education), | Road, footpath- condition |
| Climate related info - Occurrence of rain, ozone depletion | Health data of a person (including diseases, disability) |
| Transport data - Total number of vehicles (two wheelers, LMV, HMV, HTV etc) | |

Figure 4(b)

Liveability Index - Independent Parameters-Traffic &Transport

| Sl. No | Parameter (locality related) | Can it be done via a wearable device (Online services, Sensor data, Paid 3rd Party services) (1) | Significance to Livability Index (2) | Factor with respect to livability | Notes 1 | Weightage |
|---|---|---|---|---|---|---|
| 1 | Traffic data | GPS | To determine the movement of vehicles, in a locality | Primary | Determination of traffic, more safer, but considered less healthy | 1.9 |
| 2 | Duration of traffic | GPS, accelerometer | To determine the average time of traffic at particular time or any time of a day | Primary | Determination of duration of traffic, people movement-more safer, but considered less healthy (if more traffic signal time is found) | 1 |
| 3 | Presence of Traffic signal | online services, Govt Traffic Police database | To determine overall time consumed in traffic, the smoke by vehicles, movement of vehicles when traffic signal is ON, or OFF etc | Primary | Presence of traffic signal, the locality is well maintained, but not healthier environment | 0.7 |
| 4 | Probability of occurring traffic at different time in a day | GPS, accelerometer | To determine the likelihood of occurring traffic in a locality, with respect to overall movement of vehicles, operation of traffic signals, duration of traffic signals etc | Primary | The probability of traffic is to determine the traffic index but if prolonged traffic is detected, then less healthy | 0.9 |
| 5 | Movement of vehicles (speed – slow, medium, fast over speeding) | GPS, accelerometer | To determine the motion of vehicles, and thereby calculating the probability of occurring traffic, or smooth movement of vehicles | Primary | The movement of vehicles determine different traffic patterns, possibility of traffic occurrence, quantity of pollution may occur | 1 |
| 6 | Road - speed of walking/jerks can be determined | Gyroscope, Accelerometer, Online services | To determine road type, road condition, Road size (used by people), speed breaks, pot holes in a road in a locality | Secondary | to detect the condition of road/civic amenities, if more jerk/pot holes are found, then less livable, but with more speed breaks then more livable | 0.5 |
| 7 | Footpath | Online services, Gyro, accelerometer | condition of foot path, in a locality, no foot path, size of foot path in a locality | Secondary | to detect the smooth motion of people, and to determine the condition of foot path based on the motion, gyro of user, if smoothness is maintained by the user, then more livable | 0.4 |
| 8 | Traffic intersections with pedestrian crossing | online services | | Secondary | to indicate safe crossings in a road | 0.4 |
| 9 | Vehicles (bus, auto, train, metro, or any vehicle for travel) | mobile sensor, GPS, accelerometer, gyro | To determine the accessibility to one location to another location, it also involves movement of vehicles, routes, mode of vehicles, total number of vehicles in road, it also used to determine the pollution in that locality due to vehicle and its movement | Primary | Accessibility to people (transportation points, transport mode) - more accessible - more livable, more people movement - more safer more vehicle movement - more safer - but less healthy | 0.8 |
| 10 | Travel routes | smart wearable, online services, mobile sensor, GPS | | Primary | | 1.2 |
| 11 | Transportation points | smart wearable, online services, mobile sensor, GPS | | Primary | | 1.2 |
| | | | | | | **10** |

Figure 5

Livability Index - Independent Parameters-Water

| Sl. No | Parameter (locality related) | Can it be done via a wearable device (Online services, Sensor data, Paid 3rd Party services) (1) | Significance to Livability Index (2) | Factor with respect to livability | Notes 1 | Weightage |
|---|---|---|---|---|---|---|
| 12 | Water availability-data Underground water | Borewell companies (sensor data) | Availability of water resources underground (in a locality) must be determined - for drinking/ or various other purposes | Primary | More livable is water content is more, | 3.5 |
| 13 | Depth of water availability | Borewell companies (sensor data) | To determine depth at which water is available underground - helps to plan and construct borewells or well | Primary | If we find water at comparatively less depth (in feet), then more livable | 3 |
| 14 | Quality of water | Borewell companies (sensor data) | To determine optimal pH value consumable by people in a locality | Primary | If we find water is qualified to be drinkable with standards of drinkability, then more livable | 3.5 |
| | | | | | | |
| | | | | | | 10 |

Figure 6

Livability Index - Independent Parameters-Environment

| Sl. No | Parameter (locality related) | Can it be done via a wearable device (Online services, Sensor data, Paid 3rd Party services) (1) | Significance to Livability Index (2) | Factor with respect to livability | Notes 1 | Weightage |
|---|---|---|---|---|---|---|
| 15 | Terrain data, building data, open space | Online services, Sonar, proximity sensors | The geographical data relating to a locality must be determined | Primary | To know the elevation, slope, the distribution and density of buildings in a locality, mountains, hills, location of airports, lakes, forest area, Plain lands will be more livable, Populated area, More safety, prone to land slides | 0.3 |
| 16 | Geographical content (latitude and longitude) | GPS | The positioning of the person/location/locality area must be precisely determined | Primary | To locate the position of a person, place or location | 0.3 |
| 17 | Seismic data | Online services - Indian Seismic and GNSS Network (ISGN) and United States Geographical Survey (USGS)- historic downloadable data available | The geological survey data is important to determine the occurrence of earth quake or vibration on earth crust (to determine safety), No of such occurrences meaning not safer | Primary | To analyze the land conditions, tremors, earthquakes etc When the occurrence of such conditions are high, then less livable | 2 |
| 18 | Parks-area, depth in sq.km | Online services | park condition, aesthetic, cleanliness in a locality | Primary | the presence of more parks determines, the locality is more livable, it's even distribution is also considered to determine livability | 1 |
| 19 | lakes-area in sq.km | Online services | area of lake, its maintenance, maintaining the aesthetic of lake in a locality | Primary | presence of lake is considered, more livable, because open space is available | 1 |
| 20 | Climate related info, Temperature | sensors, smart wearable, online services - windy, accuweather | to determine the climatic conditions/variations of a locality | Primary | to analyze the climatic conditions of the locality, range of temperature info to determine the livability | 1 |

Figure 7(a)

| | | | | | | |
|---|---|---|---|---|---|---|
| 21 | Pressure | sensors, smart wearable, online services | to determine the climatic conditions/variations of a locality | Primary | to analyze the climatic conditions of the locality, range of pressure variation, humidity info to determine the livability | 1 |
| 22 | Humidity | | | | | |
| 23 | Wind Strength | | | | | |
| 24 | Pollution<br>i) Quantity and distribution of gases ($O_2$, $CO_2$, etc),<br>ii) Flow of gases towards a direction, iii) Change in quantity of gases due to factories (chemical, toxic, leather etc) | Gas sensor, online services, mobile sensor | to determine the pollution in a locality, due to various gases<br><br>to determine the accumulation of gases/flow of gases from one location to another<br><br>to determine the quantity and quality of gases released by factories, in a locality, which helps in determining pollution/air quality | Primary | to analyze the various gases in the atmosphere, disposition of gases from factories, and its spread to other localities (due to wind flow)- pollution index - More toxic gases - less livable | 3.4 |
| | | | | | | |
| | | | | | | 10 |

FIG. 7(b)

Livability Index - Independent Parameters-Health

| Sl. No | Parameter (locality related) | Can it be done via a wearable device (Online services, Sensor data, Paid 3rd Party services) (1) | Significance to Livability Index (2) | Factor with respect to livability | Notes 1 | Weightage |
|---|---|---|---|---|---|---|
| 25 | Location of hospitals, clinics, medical shops | online services | To determine location of hospital, clinics, medical shops in a location, data can be shared with user | Primary | Location and distribution of hospitals in a locality determine more livable | 0.9 |
| 26 | Number/frequency of visits by a person to hospitals, clinics, medical shops | GPS/Location tracking devices | To determine frequency of visits to hospital, clinics, medical shops in a location, the data collected may be used to determine the health index of a person | Primary | Frequency of visits to hospital determine, the disease index of the location and considered less livable in terms of health | 1 |
| 27 | Noise level index | Mobile sensor | to determine noise level of a locality | Primary | Less noise, more health | 1.5 |
| 28 | Disease index | Online services- Centers for disease control and prevention (CDC, USA) | to determine the health-related data in a locality, number of people with diseases (frequent visit to hospital or clinic, purchase of medicines etc) | Primary | To know the locality is healthier enough | 1.2 |
| 29 | Health data of a person (including diseases, disability) | heart rate sensor, other gyro-based sensor for detecting Disability | to determine the health data of a person | Primary | More disease index - less livable | 0.5 |
| 30 | People who visit hospital, clinics (probability) | Location trackers/online services, GPS | to identify the frequent visit of a person to hospital/clinic in a locality | Primary | More number of visits - less livable | 1 |
| 31 | Gym activity/ fitness tracker | mobile sensor/smart wearable tracking activities | to determine the health data of a person based on its activity | Primary | More number of visits - more livable | 1 |

Figure 8(a)

| | | | | | | |
|---|---|---|---|---|---|---|
| 32 | Any health-related activity such as marathon, events related to health in a locality | mobile sensor/smart wearable tracking activities, online services | to determine the likelihood of participating in such activities by the people (in a locality) | Primary | More number of such activities - more livable | 0.4 |
| 33 | People who do yoga, pranayama (regular manner), location of institutes | mobile sensor/smart wearable tracking activities | to determine how frequent the people performing yoga and keeping their health in good condition, location of such institutes determine healthier people | Primary | Distribution and location of such places, more livable - in terms of accessibility | 0.4 |
| 34 | Mobile phone access - Time spent in mobiles, games, social networks, you tube etc | sensors, device activity information, access to mobile applications | to determine the usability of mobile phones or social networks by people in a locality, who simply visit those pages now and then, wasting the time | Primary | More usage - less healthy | 0.7 |
| 35 | Mobile phone access -By different age groups | smart wearable, mobile devices, | to determine, the age class of people who uses mobile more, and determine its implications | Secondary | Age group determine, people prone or addicted to mobile devices | 0.4 |
| 36 | Mobile phone access - Probability of radiation from mobile devices | mobile sensors, temperature sensor, type of mobile devices, acceptable SAR value | to determine the likelihood of getting affected by radiation emitted by mobile phones, due to their continuous usage | Secondary | continuous use of mobile devices, more time in mobile/mobile data - less livable | 1 |
| | | | | | | |
| | | | | | | 10 |

Figure 8(b)

Livability Index - Independent Parameters-Amenities

| Sl. No | Parameter (locality related) | Can it be done via a wearable device (Online services, Sensor data, Paid 3rd Party services) (1) | Significance to Livability Index (2) | Factor with respect to livability | Notes 1 | Weightage |
|---|---|---|---|---|---|---|
| 37 | Hospital data - Number of hospitals, clinics, medical shops, total number of beds in hospital | online services | To determine number of hospital, clinics, medical shops in a location, data can be shared with user | Primary | Number of hospitals determine more livable, in terms of accessibility | 1 |
| 38 | location information & data of Fire station, Police station | GPS, online services | Location information, real-time determination of visiting a place in a surrounding locality to address any issue by the officials (Accessibility to such places by the officials) | Primary | Location and distribution of fire stations/police station in a locality determine more livable (accessibility factor) | 1 |
| 39 | School, colleges | GPS, online services | Location information, number of people who visit to these places | Primary | Location and distribution of school, colleges in a locality determine more livable (accessibility factor) | 1 |
| 40 | Electrical sub-station, hubs, transformers, power cuts | GPS, online services | Location information, real-time determination of visiting a place in a surrounding locality to address any issue by the officials (Accessibility to such places by the officials) | Primary | Location and distribution of offices/access points in a locality determine more livable (accessibility factor) | 0.6 |
| 41 | Number of yoga/fitness health teaching institutes teaches such activity | online services, GPS | to determine total number of such institutes in a locality | Primary | Distribution and location of such places, more livable - in terms of accessibility | 0.7 |
| 42 | Number of parks, trees | online services, Govt Ministry of Environment, Forest and climate change, GPS | to determine total number of trees (different varieties), which can consume the pollution accumulated in that locality | Primary | More parks and tress - more livable | 1.5 |

Figure 9(a)

| | | | | | | |
|---|---|---|---|---|---|---|
| 43 | Affordability index - Shopping complex, jewelry shops, life style shops | GPS, location tracking, online services, mobile sensors, | The frequent or visit to such places determine likelihood | Secondary | spread of places determine accessibility- nearer more livable | 1 |
| 44 | Affordability index - Purchasing power | mobile app, payment tracking | Buying of products in such places indicate their purchase power | Secondary | spending on valuable/invaluable things determine person's affordability strength | 0.8 |
| 45 | Social life index - All places of social activity, entertainment, music, concerts, events, movies, parks, theme parks | GPS, location tracker, online services | Visits to social places are used to determine the selling power of the people | Primary | More people engaging activities - more livable | 1.2 |
| 46 | Spiritual index - location of temples, church, spiritual gathering | GPS, location tracker, online services | Visits to spiritual places is used to determine the peace and holiness of such places | Primary | More people visiting spiritual places - more livable | 1.2 |
| | | | | | | |
| | | | | | | 10 |

Figure 9(b)

Livability Index - Independent Parameters-Population

| Sl. No | Parameter (locality related) | Can it be done via a wearable device (Online services, Sensor data, Paid 3rd Party services) (1) | Significance to Livability Index (2) | Factor with respect to livability | Notes 1 | Weightage |
|---|---|---|---|---|---|---|
| 47 | Population index (people per sq.km), population density | mobile sensor, smart wearable, GPS | to determine the total number of people in a locality | Primary | the spread of people in a locality | 10 |

Figure 10

Livability Index - Dependent Parameters

| Sl. No | Parameter (locality related) | Offline data | Significance to Livability Index (2) | Factor with respect to livability | Group |
|---|---|---|---|---|---|
| 48 | Terrain data | Govt sources, meteorological department | The geographical data relating to a locality must be determined | Primary | Environment |
| 49 | Water consumption data – by people Daily consumption data – water (drinking) | Govt sources, water supply companies | To determine overall consumption of water in a locality | Primary | water |
| 50 | Quality of water | Govt services, water supply companies, Water pollution control board | To determine the quality of water consumed by people in a locality | Primary | water |
| 51 | Condition of civic amenities - drains, its pathways, footpath | Govt-PWD dept, satellite imagery | Monitor flow of drainage, sewage, through canals, without clogging, condition of drains in heavy rains, in a locality | Primary | Environment |
| 52 | Number of waste dump yards, its location from locality, amount of waste dumped per day/hour/minute/second | Govt Municipal authority, satellite imagery | To quantify amount of waste accumulated and dumped from a locality | Primary | Waste management |
| 53 | Segregation units | Govt Municipal authority, satellite imagery | To monitor disposal of waste material from a locality | Primary | Waste management |

Figure 11(a)

| | | | | | |
|---|---|---|---|---|---|
| 54 | Medicine data - Sale of medicines (in hospital, clinics, medical shops) | Offline supplier data for each locality/city - Bulk Drug Manufacturers Association (India), Organization of Pharmaceutical Producers of India (OPPI), INDIAN DRUG MANUFACTURERS' ASSOCIATION | Determining sale of medicines/medicinal products determine the medicinal consumption of a locality | Secondary | Health |
| 55 | Police data – information relating to Theft, accident, burglary, murder or any other incidents in police database | Govt, police database | To determine the crime index of a locality | Primary | Society |
| 56 | Disease index | Govt Health dept, National Centre for Disease Control(India), Centers for disease control and prevention (CDC, USA) | to determine the health related data in a locality, number of people with diseases(frequent visit to hospital or clinic, purchase of medicines etc) | Primary | Health |
| 57 | Air quality | Central pollution control board, National air quality index | to determine the air quality of a location based on presence of parks, trees, vehicle emissions, pollution, etc | Primary | Health |
| 58 | Child index - Number of infant/children (age range),Health and Medicine monitor for children below 5 yrs | Govt-Department of health, Centers for Disease Control and Prevention | to determine whether any child is affected with any diseases, between 0-5 years, health and nutritional drops/ medications can be provided to avoid such disease | Secondary | Health |

Figure 11(b)

| | | | | | |
|---|---|---|---|---|---|
| 59 | School information (timings, no. of children studying, quality of education), | School database, Govt database | to determine traffic during such timings | Secondary | Amenities |
| 60 | Climate related info - Occurrence of rain, ozone depletion | Govt sources, meteorological department | considering weather parameters and prediction of such incidents | Secondary | Environment |
| 61 | Transport data - Total number of vehicles (two wheelers, LMV, HMV, HTV etc) | Govt sources, RTO data | Number of vehicles is indirectly providing probability of occurring traffic | Secondary | Transport |
| 62 | Factory index - Information relating to small, medium, large, chemical related factories | Govt-MSME, Factory association index, | to determine total number of such factories in a locality and its operation affecting the people | Secondary | Environment |
| 63 | Factory index - People dependency index / employment index | Govt-MSME, Factory association index | to determine people dependency to such factories, | Secondary | Environment |
| 64 | Healthcare professionals per 10,000 population | Hospital data, distribution of professionals | to map this data with population index and to arrive at a probability of no. of persons per professionals | Primary | Health |
| 65 | Response time in case of health emergencies | Hospital database | to determine the responsiveness of the emergency systems in hospitals | Primary | Health |
| 66 | Period prevalence of diseases | Hospital database, disease spread index | to analyze and determine occurrence of any diseases in a locality | Secondary | Health |
| 67 | Population index (people per sq.km), population density | Govt Population index data | to determine the total number of people (spread) in a locality | Primary | Population |

Figure 11(c)

| | | | | | |
|---|---|---|---|---|---|
| 68 | Number of parks, trees | Govt Ministry of Environment, Forest and climate change | to determine total number of trees (different varieties), relative to consumption of accumulated pollution in that locality<br>More parks and tress - more livable | Primary | Amenities |
| 69 | Electrical sub-station, hubs, transformers, power cuts | Govt electricity board | Location information, real-time determination of visiting a place in a surrounding locality to address any issue by the officials (Accessibility to such places by the officials) | Primary | Amenities |
| 70 | Affordability index - Purchasing power | Govt financial index | To determine the purchasability of goods/things in a locality, affordability of such goods with respect to other localities<br><br>spending on valuable/invaluable things determine person's interest & affordability strength | Secondary | Amenities |
| 71 | Noise level index | Govt index, central pollution control board | to determine noise level of a locality<br>Less noise, more health | Primary | Health |
| 72 | Parks-area in sq.km | Govt database | park condition, aesthetic, cleanliness in a locality | Primary | the presence of more parks determines, the locality is more livable, it's even distribution is also considered to determine livability (Environment) |
| 73 | lakes-area in sq.km | Govt-lake conservation and development authority, satellite imagery | area of lake, its maintenance, maintaining the aesthetic of lake in a locality | Primary | presence of lake is considered, more livable, because open space is available (Environment) |

Figure 11(d)

| | | | | | |
|---|---|---|---|---|---|
| 74 | Pollution<br>i) Quantity and distribution of gases ($O_2$, $CO_2$, etc),<br>ii) Flow of gases towards a direction, iii) Change in quantity of gases due to factories (chemical, toxic, leather etc) | Govt-factory index | to determine the pollution in a locality, due to various gases<br><br>to determine the accumulation of gases/flow of gases from one location to another<br><br>to determine the quantity and quality of gases released by factories, in a locality, which helps in determining pollution/air quality | Primary | to analyze the various gases in the atmosphere, disposition of gases from factories, and its spread to other localities (due to wind flow)- pollution index - More toxic gases - less livable (Environment) |
| 75 | Water availability-data Underground water | Water Resources Information System of India (WRIS) & Central Ground Water Board (CGWB data), Govt | Availability of water resources underground (in a locality) must be determined - for drinking/ or various other purposes | Primary | More livable is water content is more, (water) |
| 76 | Depth of water availability | WRIS & CGWB | To determine depth at which water is available underground - helps to plan and construct borewells or well | Primary | If we find water at comparatively less depth (in feet), then more livable (water) |
| 77 | Quality of water | WRIS & CGWB | To determine optimal pH value consumable by people in a locality | Primary | If we find water is qualified to be drinkable with standards of drinkability, then more livable (water) |
| 78 | Vehicles (bus, auto, train, metro, or any vehicle for travel) | Govt transport dept | To determine the accessibility to one location to another location, it also involves movement of vehicles, routes, mode of vehicles, total number of vehicles in road, it also used to determine the pollution in that locality due to vehicle and its movement | Primary | Accessibility to people (transportation points, transport mode) - more accessible - more livable<br>more people movement - more safer<br>more vehicle movement - more safer - but less healthy (Traffic & Transport) |
| 79 | Travel routes | Govt transport dept | | Primary | |
| 80 | Transportation points | Govt transport dept | | Primary | |

Figure 11(e)

| | | | | | |
|---|---|---|---|---|---|
| 81 | Road, footpath - condition | Govt Pwd dept | condition of foot path, in a locality, no foot path, size of foot path in a locality | Primary | to detect the smooth motion of people, and to determine the condition of foot path based on the motion, gyro of user<br>if smoothness is maintained by the user, then more livable<br>(Traffic & Transport) |
| 82 | Health data of a person (including diseases, disability) | heart rate sensor, other gyro based sensor, Disability records in Govt hospital | to determine the health data of a person<br><br>More disease index - less livable | Primary | Health |

Figure 11(f)

METHOD AND SYSTEM FOR DETERMINING LIVEABILITY AND HEALTH INDEX

CROSS-REFERENCE TO RELATED APPLICATIONS

This application is a national phase application under 35 U.S.C. § of International Application No. PCT/SG2019/050116 filed Mar. 1, 2019, which claims the benefit of and priority to Singapore Patent Application No. 1020180148Y filed Mar. 5, 2018.

FIELD OF THE INVENTION

The present disclosure relates generally to the field of indexing and classifying different geographical locations and in particularly relates to methods and systems for determining a liveability and halth index of a geographical location.

BACKGROUND

Generally, the value of a geographical location value is dependent upon the nature of facilities and enmities available in and around that geographical location. The value of geographical location may not be seen only in the light of commercial aspects but also in the light of requirements of an individual willing to stay in that area. For instance, a location having health clinics and hospitals in and around nearby may have greater importance and value for a person who is medically not fit. For such a person, a locality with a commercially higher value but having no ease of access to health clinics or hospitals may not fulfil his requirements. In another instance, a locality having high commercial value but having excess traffic problems may not attract an individual. Thus, the value of location may vary from one individual to another.

Several manual surveys are conducted by city planning companies and forums to classify geographical locations. Such manual surveys include, but not limited to, identifying various issues prevailing in various geographical locations, amenities existing in the location, etc. However, such surveys have a disadvantage that the data once captured cannot be updated and corrected in real time or on automatic basis. A second periodic manual survey needs to be conducted to update the data. Moreover, such surveys are conducted at a very generic level, and may not provide any assistance on an individual basis. In other words, the surveys are not conducted to fulfil the requirements of a particular individual.

Accordingly, there exists a need to develop methods and systems that can analyze various parameters, environmental conditions, civic amenities, etc., and accordingly identify a liveability and health index for a user in respect of a geographical location.

BRIEF SUMMARY

In an embodiment, a method of determining a liveability index of a geographical location is provided. The method includes the steps of: monitoring, using a smart device, environmental conditions and one or more activities of a user in a geographical location; identifying a first set of data values relating to one or more first parameters based on said monitoring of environmental conditions and one or more activities of said user in said geographical location; fetching, from a memory location, a second set of data values relating to one or more of second parameters corresponding to said geographical location; transmitting said first set of data values and second set of data values relating to one or more first parameters and second parameters to a server; classifying each data value based on type of associated parameter, time of monitoring, location co-ordinates of said geographical location; comparing each of classified data values with predefined data values; computing a liveability index of said geographical location based on comparison of each of classified data values with predefined data values and weightage assigned to each parameter associated with said data values; creating a liveability map based on computed liveability index; and rendering said liveability map along with liveability index to a user device.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 4(*a*)-4(*b*) show tables listing set of parameters in accordance with an embodiment of the present disclosure; and FIGS. 5, 6, 7(*a*)-7(*b*), 8(*a*)-8(*b*), 9(*a*)-9(*b*), 10, and 11(*a*)-11(*f*) show detailed tables listing detailed table listing set of parameters along with their significance in determining liveability index in accordance with an embodiment of the present disclosure.

Figure 1:
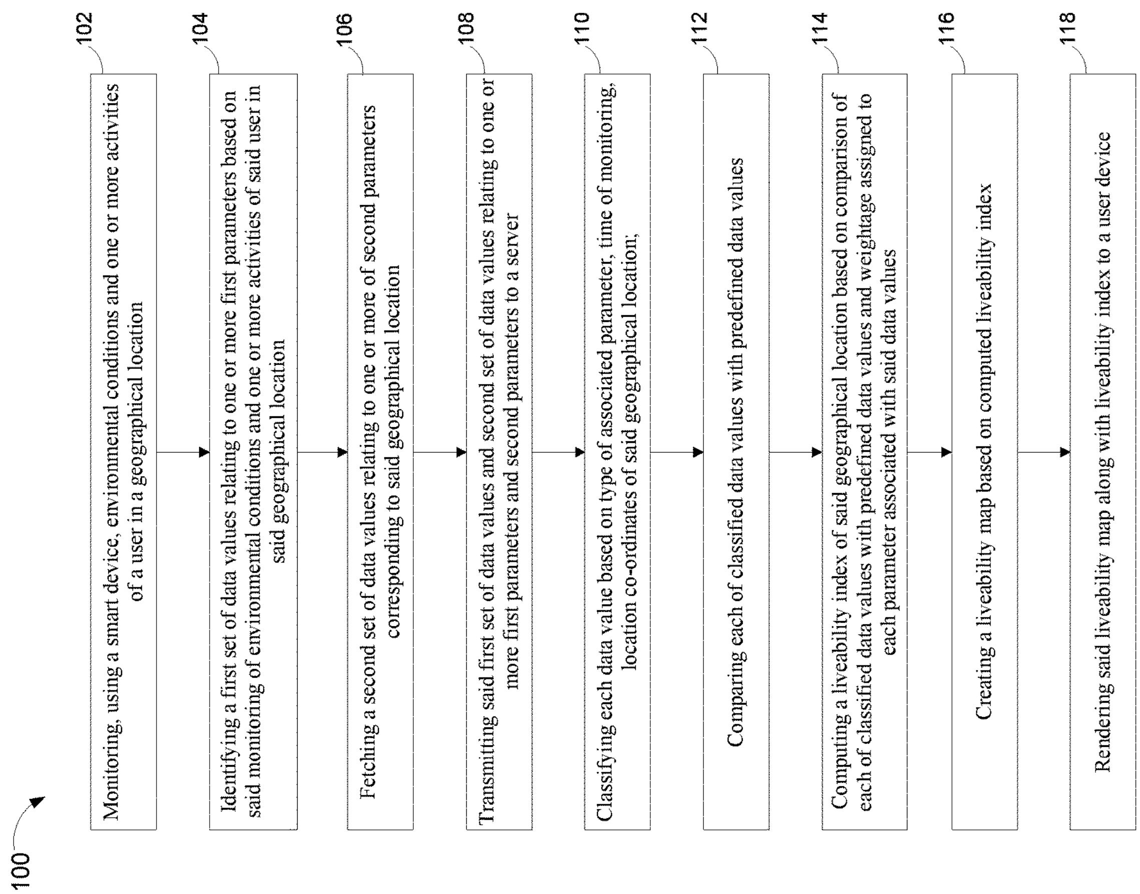
FIG. 1 shows a flowchart for a method of determining liveability index of a geographical location in accordance with an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting. Embodiments of the present disclosure will be described below in detail with reference to the accompanying drawings.

FIG. 1 illustrates a flowchart for a method 100 of determining a liveability index of a geographical location. The method 100 includes step 102 of monitoring, using a smart device, environmental conditions and one or more activities of a user in a geographical location. The smart device is generally a smart wearable device, including but not limited, to a smart watch, smart fitness bands, smart shoes, smart glass, smart earphones/headphones, smart clothing, smart jewelry to name a few.

The smart device is configured to operationally interconnect to a mobile device. In an embodiment, the smart device may be one of mobile devices, or any computing device. The one or more activities of the user include, but not limited to, walking, jogging, running, cycling, driving, talking, exercising, listening, dining, travelling, shopping, playing, watching, sleeping, any medical related activity, any interpersonal activity, any movement of hands or any operational activity captured by means of a sensor or plurality of sensors. The geographical location may be determined using the GPS sensor in-built in the smart wearable device and/or the mobile device connected to the smart wearable device.

In an embodiment, the liveability may be determined for any geographical point (with latitude and longitude), street, road, area, locality, sector, constituency etc. In one implementation, the user may be provided with an option to manually enter the geographical location of which the liveability index is to be determined. Thereafter, the method 100 includes step 104 of identifying a first set of data values relating to one or more first parameters based on said monitoring of environmental conditions and one or more activities of said user in said geographical location. The first set of data values are generally monitored and measured using one or more sensors in in-built in the smart wearable device or the mobile device connected to the smart wearable device.

The sensors include, but not limited to, Gyroscope, accelerometer, proximity sensors (or distance sensors), GPS/Location tracking devices, temperature sensor, heart rate sensor, anxiety level monitoring sensor, vibration sensor, blood pressure sensor, motion sensor, light sensor, sound sensor, camera etc. In the preferred implementation, the first set of parameters generally includes those parameters that can be monitored from the user activities and also include environment related parameters that can be monitored in real time. For example, the first set of parameters relate to traffic related data, road conditions related data, humidity level, wind strength, noise levels, probability of occurring traffic at different time to name a few. The aforesaid list of parameters is provided by way of example and can include other parameters that can assessed in real-time by monitoring the user activities and environment conditions using the smart wearable device and/or the mobile device connected to the smart wearable device or the mobile device itself.

The method 100 further includes step 106 of fetching a second set of data values relating to one or more second parameters corresponding to said geographical location. The second set of parameters generally includes those parameters that may not be solely monitored using the activities of the user. The data relating to such parameters is generally fetched using the database of the third party service providers. The one or more second parameters relate to, but not limited to, number of hospitals, quality of water, number of bore-wells, average age of the population in the geographical location, number of trees, number of schools and colleges and so on. Generally, the data values relating to such parameters are fetched from the third party service providers. However, it is to be noted that the data values captured using the smart wearable device and/or the mobile device connected to the smart wearable device may also be used to determine the data values relating one or more second parameters. The data values captured using the smart wearable device and/or the mobile device may also be used to update the data previously captured by third party service providers. For instance, the details relating to presence of Traffic signal may be captured using GPS device of the smart wearable device and/or mobile device, the online services, and Government police traffic signal database.

The present disclosure intends to cover the maximum data that can be assessed using the user devices and the third party service providers either alone or in any combination thereof. The first and second set of data values include, but not limited to, to the below first and second parameters:

- Terrain data, Geographical content (latitude and longitude of a position, location), seismic data, water availability data (bore wells, number of bore wells in a locality, depth of water availability) area of city, Locality, etc.;
- Present conditions of civic amenities (such as road, footpath, parks, drains, lakes, waste dump yards, segregation units in and around location, amount of waste dumped, etc.) of a locality, total area covered by civic amenities, Condition of transportation vehicles, etc. The pathways of drain may be used (during flood, heavy raining) and alert the people to move different location, etc.;

Location and information about hospitals (number of hospitals, total number of visits by person), clinics, medical shops (sale of medicines), police station, colleges, schools, temples, electrical sub-stations, electrical hubs, transformers, jewelry shops, festival celebration (New Year, Deepavali, etc.), petrol pumps or any place or building complex (where people visit & spend more time or people interest);

Police information, such as number of theft, accident, burglary, murder, or any other incidents recorded with police database (with respect to a locality);

Real-time traffic data (duration of traffic, traffic signal, probability of occurring traffic jams, at different time in a day), over speeding of vehicles (for example, when a user is over-speeding, the system may mark that location as minimal population index. The determination of high speed is by the movement of the user in that route) in a locality;

Noise level index of a locality;

Disease index;

Number of infant, children in a locality (for polio drops), at different age groups;

Climate related info, (temperature, pressure, rain, humidity, ozone depletion, etc.);

Population index (people per sq.km);

Accessibility to transportation (bus, auto, train, metro, or any travel modes), travel routes, transportation points in a locality, total number of vehicles (two wheelers, LMV, HMV, HTV, etc.);

Information relating to gym activity, social activity, or any other health related activity, people who do yoga, pranayama in regular manner;

Information relating to time spent in mobile phones, social networks, YouTube®, etc., by different age groups, with respect to a locality;

Information relating to factory, small, medium, chemical related, large, people dependency to such factories, in a locality;

Once the first set and second of data values are determined, the first set of data values and second set of data values relating to one or more first parameters and second parameters respectively are transmitted to a server in step 108. The first and second set of data values are processed, classified and structured in step 110 based on type of associated parameter, time of monitoring, location coordinates of said geographical location, etc. The data is primarily categorized into three types, optimal data, threshold data, and real time data. The processed data is encrypted and securely stored in the database for various other purposes. Each of the processed and classified data value is further compared with corresponding pre-defined values in step 112 to determine whether the processed and classified data value falls within the optimal range or not. Generally, different range values (threshold range) are pre-defined based on the impact factor of each parameter.

In an embodiment, a data dependency factor is automatically determined by the system. For example, in the above case (traffic signal), dependency factor may be 50% for user devices (having GPS), 25% for online services and other 25% for Government traffic signal database. Further, the data dependency factor (in the traffic signal scenario) is determined through various factors that include but not limited to traffic data (past, present), traffic movement (past, present), availability of traffic data from user devices, online services, and Government traffic signal database. In another embodiment, each parameter may have data dependency factor.

The method 100 further includes step 114 of computing a liveability index of said geographical location based on comparison of each of classified data values with predefined data values and weightage assigned to each parameter associated with said data values. Each parameter is assigned a weighable value depending upon its impact on the liveability and health of an individual. For instance, water availability may be given higher weightage of excess traffic when it comes to computing the liveability index in a geographical location. Similarly, seismic data may be given higher weightage in comparison to noise levels for computing the liveability index in a geographical location.

Based on the computed liveability index, a liveability map is created in step 116 and rendered along with liveability index to a user device in step 118. Based on the liveability index and liveability map, the use gets a fair idea as to whether the geographical location is worth staying or not. In another embodiment, the method 100 includes: providing a list of parameters to user for selection; receiving from a user a list of one or more selected parameters; and computing liveability index based on data values corresponding to said one or more selected parameters and creating liveability map thereof.

In another embodiment, the method 100 includes: analyzing a pre-stored profile of the user; determining one or more parameters based on analysis of pre-stored profile the user; computing liveability index based on data values corresponding one or more parameters based on a pre-stored profile the user and creating liveability map thereof. The profile of the user includes details pertaining to income bracket of said user, family size, living style, past health history related details, and others.

In another embodiment, the method 100 includes: creating list of parameters essential for computing a liveability index of any geographical location; assigning weightages to each of said parameters essential for computing liveability index of geographical location. In an implementation, the weightages to each of said parameters may be assigned automatically based on profile of the user. In an implementation, the weightages to each of said parameters are assigned manually by the user.

In another embodiment, the method 100 includes: recommending a user to perform one or more activities, wherein said one or more activities is essential for identifying data values related to one or more first or second parameters. In an implementation, the user may be provided with step by step instructions to perform said one or more recommended activities.

In an implementation, the method 100 further includes receiving manual inputs from the user in respect of first and second data values associated with said one or more first and second parameters respectively.

In another implementation, the method 100 includes computing health index based on the parameters relating specifically those parameters that may impact health of an individual. Such health parameters include, but not limited to, quality of air, quality of water, noise levels, access to nearby hospitals, weather related data etc.

Figure 2:
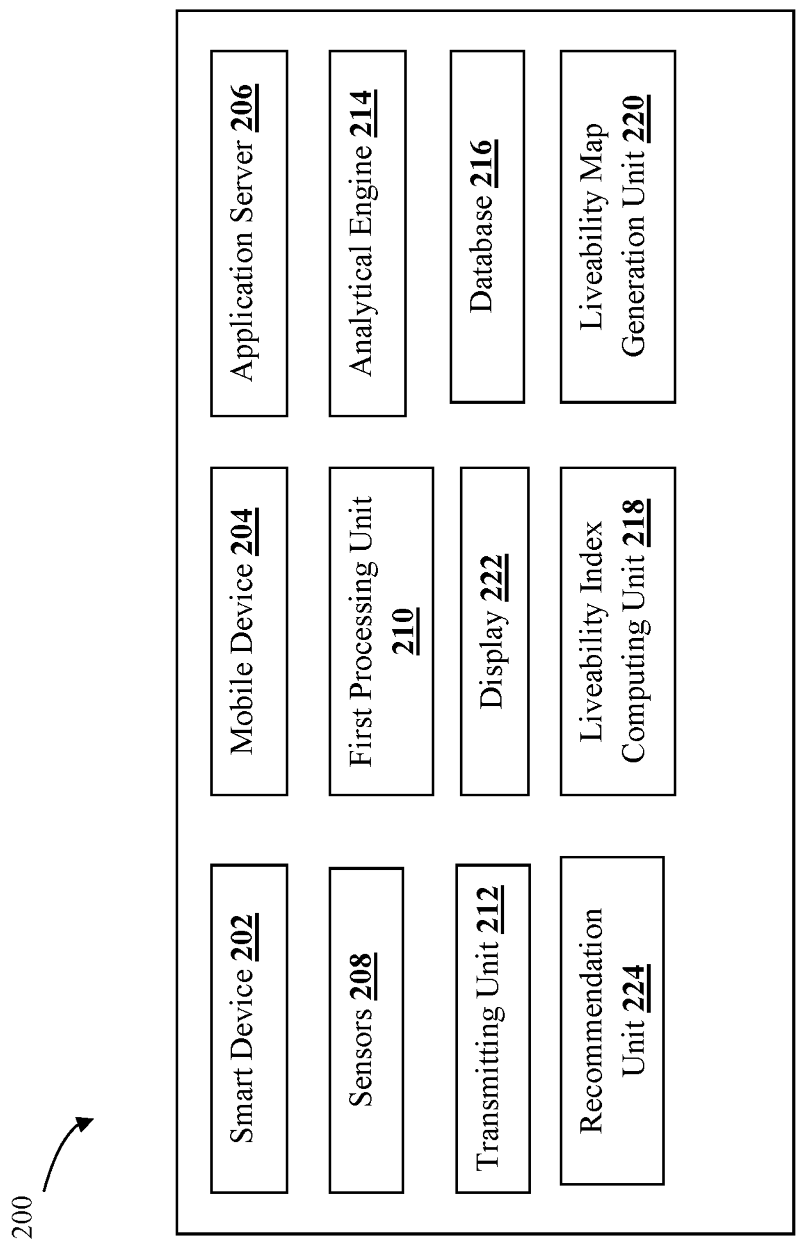
FIG. 2 shows a block diagram for a system for determining a liveability index of a geographical location by implementing the method illustrated in FIG. 1.

Referring to FIG. 2, a block diagram for a system of determining a liveability index of a geographical location is provided. The system 200 includes a smart device 202 connected to a mobile device 204 and an application server 206. The smart device 202 is preferably a smart wearable device, including but not limited, to a smart watch, smart fitness bands, smart shoes, smart glass, smart earphones/headphones, smart clothing, smart jewelry to name a few. The smart device 202 is configured to monitor environmental conditions and one or more activities of a user in a geographical location. The smart device 202 includes or is connected to one or more sensors 208 for said monitoring.

A first processing unit 210 in operational interconnection with the sensors 208 is configured to identify a first set of data values relating to one or more first parameters based on said monitoring of environmental conditions and one or more activities of said user in said geographical location. The first processing unit 210 is further configured to fetching a second set of data values relating to one or more of second parameters corresponding to said geographical location. Once the first set and second data values are determined by the first processing unit 210, a transmitting unit 212 transmits the first set of data values and second set of data values to the application server 206. The application server 206 further includes or is connected to an analytical engine 214 configured for segregating, indexing, analyzing, structuring and/or classifying each data value based on, but not limited to, type of associated parameter, time of monitoring, dependency factors, location co-ordinates of said geographical location and comparing each of classified data values with predefined data values. The analytical engine 214 is capable of processing huge amount of data values in real-time and able to distinguish and segregate various other parameters of the data values. The segregated or indexed data is stored in the database 216 for further processing by the analytical engine 214.

A liveability index computing unit 218 is further provided for computing a liveability index of said geographical location based on comparison of each of classified data values with predefined data values and weightage assigned to each parameter associated with said data values; and a liveability map generation unit 220 creating a liveability map based on computed liveability index. The liveability map (along with liveability index details) is rendered on to the user's display device 222. The liveability map may be configured to be stored onto user's mobile device 204. In an embodiment, the mobile device 204 operates independently tracks the activities of the user without the smart device 202. The details of the activities monitored by the smart device 202 are transmitted and stored in the database 216 of the application server 206.

In an implementation, the system 200 is further configured to receive inputs (with respect to that location) from the user in the form of feedbacks, suggestions, comments, and favorites, etc., to improve and update the data in the database 216. The application server 206 is configured to identify false alarm, invalid/irrelevant location data. The application server 206 may also be configured with a real-time alert module, a suggestion module.

In an implementation, the system 200 includes a recommendation unit 224 that is configured to recommend the user to perform one or more activities, wherein said one or more activities is essential for identifying data values related to one or more first or second parameters. In an implementation, the user may be provided with step by step instructions to perform said one or more recommended activities by the recommendation unit 224. The instructions may be sent in a step by step manner or may be sent at once.

Figure 3:
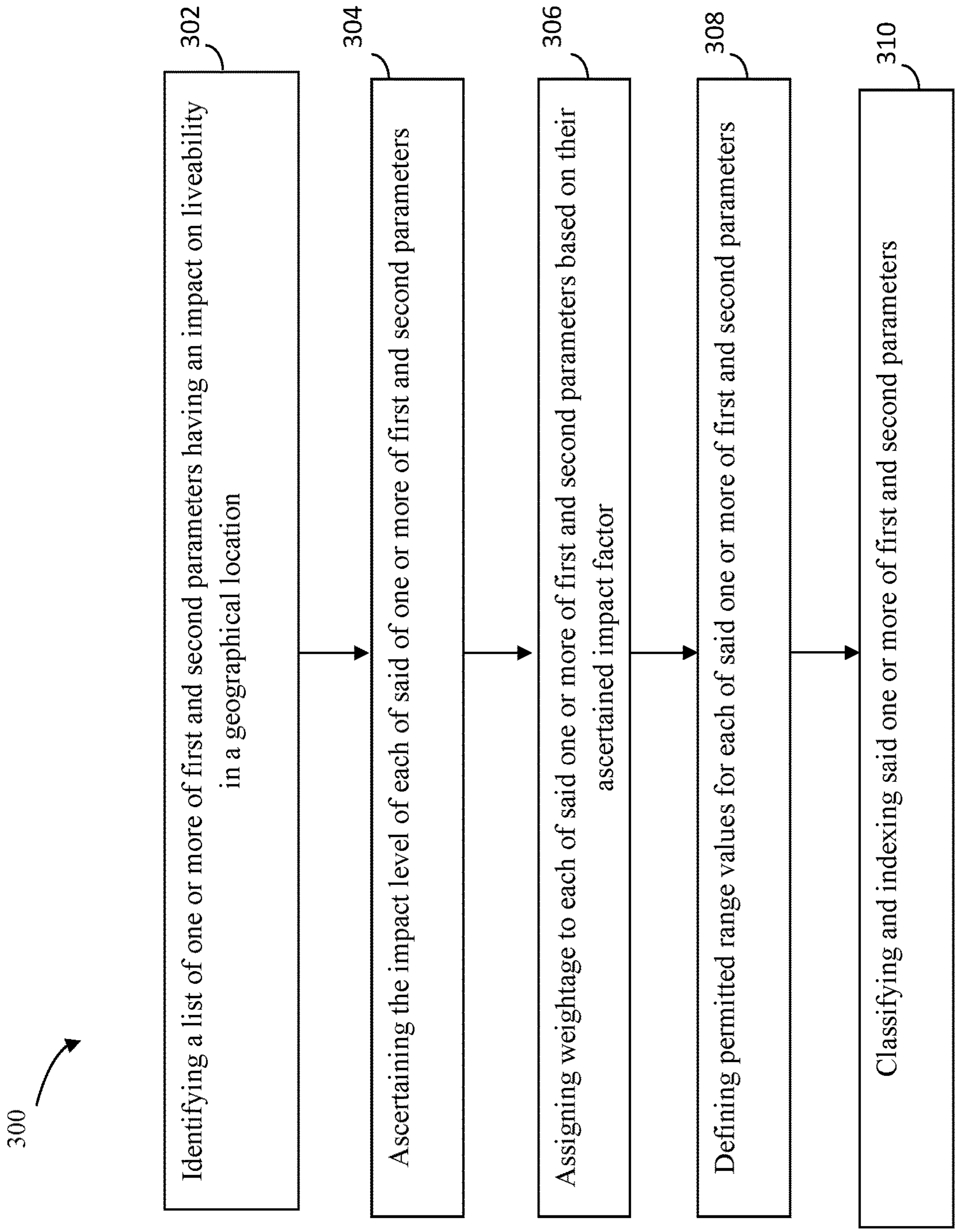
FIG. 3 shows a flowchart for a creating a list of parameters for determining liveability index of a geographical location in accordance with an embodiment of the present disclosure.

Referring to FIG. 3, a flow chart for a method of creating a list of first and second set of parameters for determining the liveability index is provided. The method 300 includes step 302 of identifying a list of one or more of first and second parameters having an impact on liveability in a geographical location. The detailed list of first and second parameters is listed in the description relating to following figures. The method 300 further includes step 304 of ascertaining the impact level of each of said of one or more of first and second parameters and step 306 of assigning weightage to each of said first and second parameters based on their ascertained impact factor. The method 300 further includes defining permitted range values for each of said first and second parameters in step 308 and classifying and indexing said one or more of first and second parameters based on one or more of permitted range values, assigned weightage, type of parameter, etc., in step 310.

Referring to FIG. 4(*a-b*), tables listing the various parameters are provided. The tables illustrate list of parameters that may be used for determining the liveability index. It is to be noted that the list of parameters is provided by way of examples and other parameters as necessary may be included as part of the disclosure. In particular, parameters relating to any environment conditions, health conditions, civic amenities availabilities, etc. that may play a significant role in deciding the liveability index in a geographic location may form part of the disclosure.

Referring to FIGS. 5, 6, 7(*a*)-7(*b*), 8(*a*)-8(*b*), 9(*a*)-9(*b*), 10, and 11(*a*)-11(*f*), a list of tables listing various parameters along with their significance in determining liveability index is provided. Each of the parameter has been provided an exemplary weightage and are primarily divided in two categories, namely primary and secondary, depending upon the impact (and importance) of the parameter on the liveability and health index of a locality. Moreover, the following details also provide details whether the particular parameter can be monitored and assessed using the smart wearable device or not. The details of the relevant primary sensors involved for monitoring details corresponding to each parameter are also provided therein.

Referring to table illustrated in FIG. 5, a list of parameters relating to traffic and transport are listed. These parameters include traffic data, traffic signal, duration of traffic, traffic intersection points and other similar parameters as illustrated in table. Considering the case with parameter relating to duration of traffic, it is to be noted that sensors such as GPS, accelerometer are used to determine the average time of traffic at particular time or any time of a day. This helps in primary determination of duration of traffic, people movements. This may help to infer that the area is safer but may considered less healthy if the value relating to the aforesaid details is high. Further, it can be noticed that a pre-defined weightage is provided to each of the parameters relating to traffic and transport. For example, as shown there, the locality or area which qualifies less than 7 may be considered as liveable locality. In an embodiment, the weightage value of any parameter may be positive (in some parameters), neutral (in some parameters) and negative (in some other parameters), depending on the category and its importance, when all liveability parameters are considered. As a whole, every category is considered to determine the overall liveability index of a location.

Likewise, the table in FIG. 6 provides similar details for parameters relating to water such as water availability, quality of water, depth of water availability, etc.

Likewise, the table in FIGS. 7(*a*)-7(*b*) provide similar details for parameters relating to environment conditions such as wind level, humidity level, terrain data, seismic data, and so on.

Likewise, the table in FIGS. 8(*a*)-8(*b*) provide similar details for parameters relating to or relevant for health, such as health data, noise levels, disease index, etc.

Likewise, the table in FIGS. 9(*a*)-9(*b*) provide similar details for parameters relating to amenities, such as number of schools, colleges, hospitals, shopping malls, affordability index level, etc.

Likewise, the table in FIG. 10 provides similar details for parameters relating to population, such as population index.

The table in FIGS. 11(*a*)-11(*f*) illustrate a list of parameters that may be dependent on the list of parameters listed in the above said tables. The data relating to such dependent parameters are generally fetched from pre-stored data provided by third parties such as government records, hospital records, police database, municipality records, satellite imagery, etc.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method of determining a liveability index of a geographical location, comprising:

recommending a user to perform one or more activities via a user device, wherein the one or more activities are essential for identifying data values related to one or more first parameters;

monitoring environmental conditions and the one or more activities of the user in the geographical location;

identifying a first set of data values relating to the one or more first parameters based on the monitoring of the environmental conditions and the one or more activities of the user in the geographical location;

retrieving a second set of data values relating to one or more second parameters corresponding to the geographical location;

transmitting the first set of data values and the second set of data values relating to the one or more first parameters and the one or more second parameters to a server;

classifying each data value in the first set and the second set of data values based on type of associated parameter, time of monitoring, and location co-ordinates of the geographical location to generate classified data values;

comparing each of the classified data values with predefined data values;

computing the liveability index of the geographical location based on a comparison of each of the classified data values with predefined data values and weightage assigned to each parameter associated with the data values;

creating a liveability map based on computed liveability index; and causing the liveability map along with the liveability index as computed to be sent to a user device and rendered thereon.

2. The method as claimed in claim 1, further comprising:

providing a list of parameters to the user for selection;

receiving from the list one or more user selected parameters; and computing the liveability index based on data values corresponding to the one or more user selected parameters and creating the liveability map thereof.

3. The method as claimed in claim 1, further comprising:

analyzing a pre-stored profile of the user;

determining one or more parameters based on analysis of pre-stored profile of the user; and computing the liveability index based on data values corresponding to determined one or more parameters based on the pre-stored profile of the user and creating the liveability map thereof.

4. The method as claimed in claim 3, wherein the pre-stored profile of the user includes details pertaining to income bracket of the user, family size, living style, past health history related details of the user, and a combination thereof.

5. The method as claimed in claim 1, further comprising:

creating a list of parameters essential for computing the liveability index of the geographical location; and assigning weightages to each of the parameters essential for computing liveability index of the geographical location.

6. The method as claimed in claim 5, wherein the weightages assigned to each of the parameters are assigned automatically based on a pre-stored profile of the user or assigned manually by the user.

7. The method as claimed in claim 5, wherein creating the list of parameters essential for computing the liveability index of the geographical location comprises:

identifying a list of one or more of first and second parameters having an impact on the liveability index in the geographical location; and ascertaining an impact level of each of the one or more of the first and second parameters; and assigning weightage to each of the one or more of the first and second parameters based on their ascertained impact factor.

8. The method as claimed in claim 7, further comprising:

defining permitted range values for each of the one or more first and second parameters; and classifying and indexing the one or more first and second parameters based on one or more of permitted range values.

9. The method as claimed in claim 1, further comprising:

providing to the user device a step by step instruction module to perform the one or more activities as recommended.

10. The method as claimed in claim 1, further comprising:

receiving manual inputs from the user in respect of the first set and the second set of data values associated with the one or more first and second parameters, respectively.

11. The method as claimed in claim 1, further comprising:

computing a health index of the geographical location based on the parameters impacting health of an individual at the geographical location.

12. A system for determining a liveability index of a geographical location, comprising:

a liveability index computing unit configured to identify a list of one or more first parameters and one or more second parameters having an impact on liveability in the geographical location;

a smart device configured to monitor environmental conditions and one or more activities of a user in the geographical location;

a first processing unit configured to identify a first set of data values relating to the one or more first parameters based on a monitoring of the environmental conditions by the smart device and the one or more activities of the user in the geographical location, and the first processing unit being further configured to retrieve a second set of data values relating to the one or more second parameters corresponding to the geographical location;

a transmitting unit configured to transmit the first set of data values and second set of data values to a server;

an analytical engine configured to classify each data value in the first set and second set of data values based on type of associated parameter, time of monitoring, location co-ordinates of the geographical location to generate classified data values, and the analytical engine being further configured to compare each of the classified data values with predefined data values;

a liveability index computing unit configured to:

ascertain an impact level of each parameter of the one or more first parameters and the one or more second parameters in the list;

assign weightage to each parameter of the one or more first parameters and the one or more second parameters in the list based on their ascertained impact factor; and compute the liveability index of the geographical location based on comparison of each of classified data values with predefined data values and the weightage assigned to each parameter of the one or more first parameters and the one or more second parameters associated with the data values;

a liveability map generation unit configured to create a liveability map based on the computed liveability index; and a display device configured to render the liveability map along with liveability index.

13. The system as claimed in claim 12, wherein the smart device is coupled to a plurality of sensors to monitor the environmental conditions and the one or more activities of the user in the geographical location and further, wherein the first processing unit is in operational interconnection with the sensors.

14. The system as claimed in claim 12, further comprising:

a recommendation unit configured to recommend the user to perform one or more activities, wherein the one or more activities are essential for identifying the data values related to the one or more first or second parameters.

15. The system as claimed in claim 14, wherein the recommendation unit is further configured to recommend to the user step by step instructions to perform the one or more activities as recommended.

16. The system as claimed in claim 12, further comprising an analytical engine configured to analyze a pre-stored profile of the user and determine one or more parameters based on analysis of pre-stored profile of the user.

17. The system as claimed in claim 16, wherein the liveability index computing unit is further configured to compute the liveability index based on data values corresponding to one or more parameters based on the pre-stored profile of the user.

18. The system as claimed in claim 12, wherein the liveability index computing unit is further configured to create a list of parameters essential for computing the liveability index of the geographical location; and assign weightages to each of the parameters in the list essential for computing liveability index of the geographical location.

19. A method of determining a liveability index of a geographical location, comprising:

creating a list of parameters that are essential for computing the liveability index of the geographical location, the list of parameters comprising one or more first parameters and one or more second parameters;

assigning weightages to each of the parameters in the list that are essential for computing liveability index of the geographical location for a user, wherein the weightages assigned to each of the parameters are assigned automatically based on a pre-stored profile of the user or assigned manually by the user;

monitoring environmental conditions and one or more activities of the user in the geographical location;

identifying a first set of data values relating to the one or more first parameters based on the monitoring of the environmental conditions and one or more activities of the user in the geographical location;

fetching a second set of data values relating to the one or more second parameters corresponding to the geographical location;

transmitting the first set of data values and the second set of data values relating to the one or more first parameters and the second parameters to a server;

classifying each data value based on type of associated parameter, time of monitoring, location co-ordinates of said geographical location to generate classified data values;

comparing each of classified data values with predefined data values;

computing the liveability index of the geographical location based on a comparison of each of the classified data values with the predefined data values and the weightages assigned to each parameter associated with the data values;

creating a liveability map based on computed liveability index; and sending the liveability map along with liveability index to a user device to be rendered on a display device.

20. The method according to claim 19, further comprising computing a health index of the geographical location based on the parameters impacting health of an individual at the geographical location.

* * * * *